US008693458B2

(12) United States Patent
Smartt et al.

(10) Patent No.: US 8,693,458 B2
(45) Date of Patent: Apr. 8, 2014

(54) PRESENTING INFORMATION AT ONE OR MORE MOBILE COMMUNICATION DEVICES IN A TRANSPORTATION NETWORK

(75) Inventors: Brian Eric Smartt, Sunnyvale, CA (US); Peter Leroy Froeberg, Cupertino, CA (US)

(73) Assignee: BlackBerry Limited, Waterloo (CA)

( * ) Notice: Subject to any disclaimer, the term of this patent is extended or adjusted under 35 U.S.C. 154(b) by 309 days.

(21) Appl. No.: 13/079,484

(22) Filed: Apr. 4, 2011

(65) Prior Publication Data
US 2012/0250540 A1    Oct. 4, 2012

(51) Int. Cl.
G06F 11/00    (2006.01)
H04J 1/16    (2006.01)
H04L 1/00    (2006.01)

(52) U.S. Cl.
USPC ......................................... 370/345; 701/411

(58) Field of Classification Search
USPC ......... 701/400, 408, 409, 431, 438, 410–413, 701/465; 705/1.1, 14.1, 14.49–14.67; 370/345, 252–254
See application file for complete search history.

(56) References Cited

U.S. PATENT DOCUMENTS

| | | | |
|---|---|---|---|
| 6,542,822 B1 | 4/2003 | Froeberg | |
| 6,553,313 B1 | 4/2003 | Froeberg | |
| 2006/0286989 A1 | 12/2006 | Illion | |
| 2007/0239537 A1 | 10/2007 | Protheroe | |
| 2009/0029721 A1 | 1/2009 | Doraswamy | |
| 2011/0043377 A1* | 2/2011 | McGrath et al. | 340/905 |
| 2011/0112760 A1* | 5/2011 | Serbanescu et al. | 701/204 |
| 2012/0054028 A1* | 3/2012 | Tengler et al. | 705/14.49 |

FOREIGN PATENT DOCUMENTS

EP    2224757 A1    9/2010

OTHER PUBLICATIONS

Extended European Search report mailed Jul. 21, 2011. In corresponding application No. 11161071.3.
Examination Report mailed Feb. 10, 2012. In corresponding application No. 11161071.3.
Summons to attend oral proceedings pursuant to Rule 115 (1) EPC mailed Mar. 21, 2013, in corresponding European patent application No. 11161071.3.

* cited by examiner

Primary Examiner — Chuong T Ho
(74) Attorney, Agent, or Firm — Novak Druce Connolly Bove + Quigg LLP

(57) ABSTRACT

The disclosure described technology for presenting information via a mobile communication device in a transportation network, the transportation network modeled by segment and time slot. Information tagged by modeled segment, modeled time slot, and aggregate demographics of a target audience in the modeled segment and modeled time slot is received. The aggregate demographics include at least route context of transportation network users in the segment and time slot. The received information, including received tagged information, is published to a communication network of the mobile communication device. The published information is filtered for published information tagged with aggregate demographics corresponding to demographics of the mobile communication device—demographics of the mobile communication device including at least a route context of the mobile communication device. The filtered information is presented via the mobile communication device.

21 Claims, 5 Drawing Sheets

PRESENTING INFORMATION AT ONE OR MORE MOBILE COMMUNICATION DEVICES IN A TRANSPORTATION NETWORK

FIELD

The technology disclosed herein (the "technology") relates to presenting information at mobile communication devices in a transportation network. Exemplary implementations relate to presenting ads to positioning-enabled and geolocation-enabled cellular telephones in a road network.

BRIEF DESCRIPTION OF THE DRAWINGS

Reference will now be made, by way of example, to the accompanying drawings which show example implementations of the technology.

DETAILED DESCRIPTION

Figure 1:
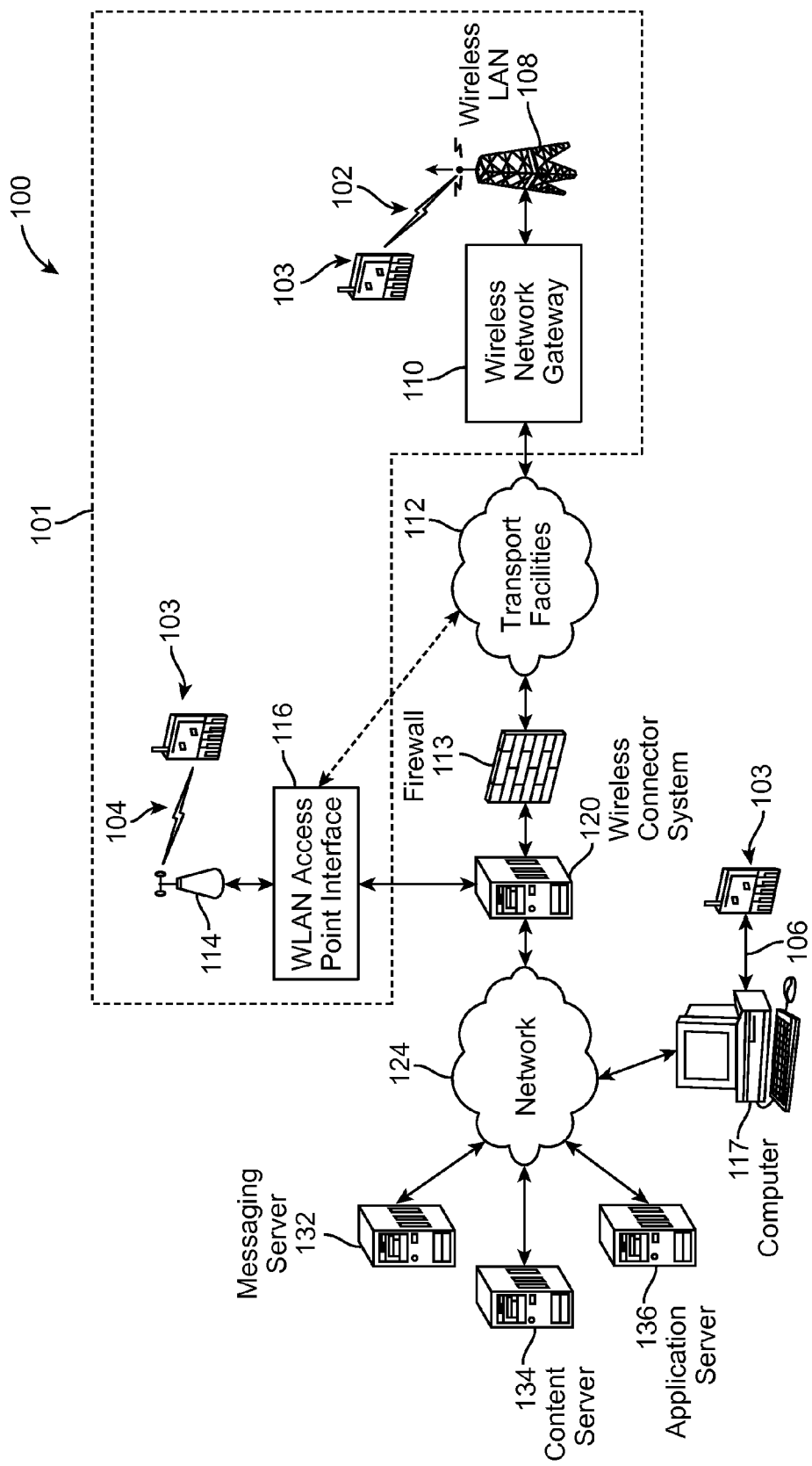
FIG. 1 illustrates in block diagram form, a communication system in which implementations of the technology can be applied.

Reference now will be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

It is desirable to present information via mobile communication devices in a transportation network. However it can be difficult to determine which information to present via which mobile communication device and when to present the information. Technical factors that may contribute to the problem include the limited bandwidth of the mobile communication devices; limited output capability, e.g., display space, on the mobile communication devices; limited processing resources on the mobile communication devices; privacy, e.g., while individualized information is desired, tracking individual devices is generally undesirable; limited availability of targeted users due to attention paid by the user to the transportation network; the receive-only nature of some mobile communication devices.

In example implementations of the technology, information can be commercial advertisements ("ads"). Implementations of the technology can find application in presenting other types of information, e.g., news, weather, entertainment, and command & control.

In some implementations of the technology, the transportation network can be a road network. The transportation network also can be a railway network, an air-traffic network, a shipping lane network, a network of paths between a rally point and an objective, a network of sidewalks, a network of bike paths, a multimodal transportation network, and other such examples.

Each mobile communication device can be one of a variety of devices enabled to determine at least one of position and geolocation of the device, along with a route context of the device. Such devices, and communication networks in which some such devices can operate, are described elsewhere in this document. Example devices include, but are not limited to, a wireless local area network-enabled tablet computer, a receive-only Global Positioning System (GPS) device, a geolocation-enabled smart phone. Example implementations disclosed herein are based on mobile communication devices that are location-based services (LBS)-enabled smart phones with geolocation accuracy sufficient to determine geolocation of the mobile communication device in relation to a road network, and to determine a route context of the device. Route context can include origin, destination, via points, routes (including multiple routes), layovers, and other elements of an itinerary past, present, and planned.

Figure 2:
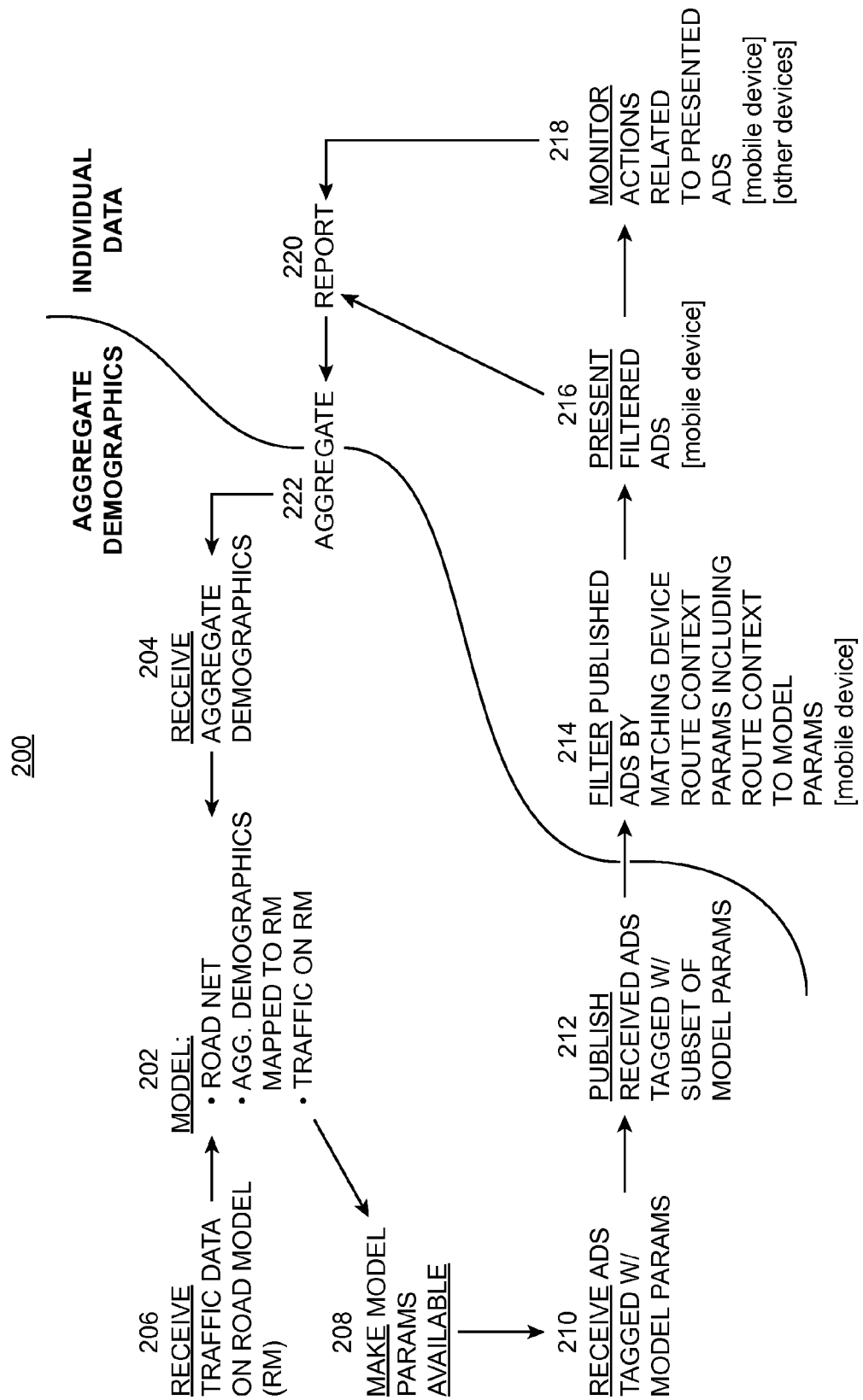
FIG. 2 illustrates methods of the present technology.

Referring to FIG. 2, methods of the technology 200 using an LBS-enabled smart phone on a road network are illustrated. In such methods, the technology can model 202: the road network; aggregate demographics of users of the road network over time referenced to the road network; and in some implementations, traffic volume over time referenced to the road network.

The road network can be modeled in "segments," where a segment can correspond to a single direction on a block of roadway. For example, northbound $14^{th}$ Street NW in Washington D.C. between F St. NW and G St. NW can be a segment. In some embodiments, a single lane in a single direction between two endpoints, e.g., the leftmost lane of $14^{th}$ St. NW, Washington, D.C. between F. St. NW and G. St. NW can be a segment. Each segment can be characterized by attributes such as street name, street type, speed limit, etc. Road segments can include not only public roads, but also can include areas such as shopping centers, arenas, and parking lots. In any event, the granularity of the transportation network model can be commensurate with the accuracy and precision of available geolocation or positioning technology in the mobile communication devices.

Modeling aggregate demographics of road network users in reference to road network segments and time slots allows the technology to target certain ads to a certain subset of users without knowing which individual mobile communication device users are on that road segment in that time slot. For example, for the fifteen (15) minute time slot between 8:00 a.m. local time and 8:15 a.m. local time during a typical weekday on the northbound road segment of 1-95 between Exit 161 and Exit 163, 75% of road network users on that road segment are commuting to destinations within ten (10) miles of that road segment (an example of route context expressed as distance from the road segment), while 25% are travelling to destinations beyond ten (10) miles of that road segment. As another example, consider that during the 6:00 p.m.-6:15 p.m. time slot on that same road segment on each July $4^{th}$, 99% of vehicles are traveling to watch fireworks on the National Mall (an example of route context expressed as destination). As another example, consider that most all road network users located in the parking lot of a Home Depot can be characterized as "interested in home improvement products and services." In general, a set of aggregate user characteristics can be associated with a {time slot, road segment} pair in the model. Such information can be accumulated over time through various means and supplied to the model as input 204. Note that the population of road network users does not have to be identical to the population of mobile communication device users on the road network. Time slots do not have to be uniformly sized over a period such as a day.

Modeling traffic volume over {time slot, road segment} can enable a marketplace for {time slot, road segment, aggregate user characteristics subset} combinations. Ad/offer opportunities for high demand slots can be priced higher than lower demand combinations. Auction principles can be used as a means to set prices. Traffic data keyed to {time slot, road segment} can be supplied to the model as input 206.

The model parameters can be made available to potential advertisers 208.

The technology can receive 210 ads for {road segment, time slot, aggregate characteristic subset} purchased by an advertiser. The ads can be tagged with the {road segment, time slot, aggregate characteristic subset}.

The technology can publish 212 received ads to mobile communication devices via the communications network per the {road segment, time slot} tag specified with the ad. Note that in some embodiments, the aggregate characteristic subset, while published with the ad, is not a factor in publishing the ad to the communication network. Ads can be published to a road segment in a variety of ways. For example, in a cellular telephone network each base station covers a set of road segments. Ads to be published for road segments covered by a particular base station can be published through that base station. Some segments may be covered by multiple base stations, in which case, each base station covering the segment can publish the ads specified for that segment at the appropriate time slot. In some implementations, ads can be published by making them available on an ad server. As an additional example, publishing can use a wireless local area network. In server-publishing implementations other attributes, e.g., characteristics of specific users, sent to the server can filter which ads get sent by the server. For example, if a user is driving an electric car, and that information is available to the server, the server could refrain from publishing ads for gas stations.

Until this point, the illustrated methods can be performed without knowledge of the specific mobile devices located in a specific road segment at a specific time slot, thus supporting mobile user privacy. Now that ads for a (road segment, time slot} are published, a mobile communication device on a road segment during a time slot can filter 214 the published ads by matching device-specific parameters against the published aggregate demographics of the ads in that {road segment, time slot}. The device specific parameters include at least a route context.

Filtered ads can be presented 216 via the mobile device. Presentation can be audio, visual, and audio-visual. Presentation can be unconditional or can be conditional. Conditional presentation can involve individual device circumstances such as: number, frequency, content of prior presented ads; parameters within the transportation network, e.g., velocity, location, time; e.g., already acted on the ad or a similar ad, route (one or more of prior, present, and future). As further example, presentation can be consider factors such as not presenting while on curves, not presenting when in school zone during arrival departure times, and not presenting while at gas stations.

Implementations of the technology can use various approaches to monitor 218 actions related to presented ads. As examples, the technology can monitor when the mobile communication device requests more information regarding the ad; when the geo-location enabled mobile communication device arrives at a location related to an ad; when a purchase is made at such a location or from such an advertiser (e.g., when a purchase is made using the mobile communication device); when a mobile communication device; when a user thereof is registered, via any device, in relation to an ad; or when a coupon is exercised. Such monitoring can be, for example: via the mobile communication device; via sensors outside the mobile communication device, e.g., an RFID sensor recognizing the mobile communication device entering a retail location of an advertiser; via user action from a personal computer, e.g., entering a code provided in the ad.

The technology can report 220 on information regarding presented ads. Information that can be reported includes the identification of presented ads, the circumstances of presentation. Reporting can be performed anonymously, or with user identification (preferably with user permission). Such information can be recorded at the mobile device, or otherwise reported to the network. Recording and reporting can be performed from the device, from sensors sensing the device (e.g., RFID), from point-of-sale systems, from a computing device (e.g., when a user registers with an advertiser). Reporting can be implemented in one or both of real time, and batch. Reporting can be manual or automatic, and can require user authorization. The reported data can be aggregated 222, at least for the purpose of incorporation of the aggregated data into the model.

As other example implementations of the technology, consider a system to bid, store, and deliver time and location based ads via mobile communication devices. The system can include a geographically-referenced road, traffic, and routing network model. As a mobile communication device travels along physical roads, targeted ads are published to be delivered to the mobile communication device.

A marketplace of road segments. Each road segment in the system can model empirical directional traffic in 15-minute time slots. Additionally, route demographics derived from aggregated origins and destinations can be published for each segment and time slot. For example, between 6:00 pm and 6:15 pm, 69% of drivers traveling along a specific section of US-101S have destinations at least two hours away while 87% of drivers along the 2400 block of Sand Hill Road will be home within 20 minutes. Understanding route context for specific segments and time slots can allow an advertiser to target potential customers based on expected route in combination with proximity, traffic volume, and conventional demographics.

Scarcity in the marketplace. The capacity of a communication network to deliver ads to mobile communication devices is typically limited. If too many ads are associated with any single road segment and time slot, only a subset of those ads can be delivered to each mobile communication device. Limiting the density of offers in the system facilitates delivery of ads to an advertisers' most desirable mobiles. The desirability of specific segments and time periods (demand) combined with limits on delivery capacity (supply) can combine to create a natural valuation for each road segment and time slot within the marketplace.

Building a campaign. Campaign building and reporting tools can be useful for marketplace adoption and success. Campaign tools can enable an advertiser to construct and price an ad campaign to achieve his goals. Over time reusable campaign design patterns can be identified. Reporting, in turn, can evaluate the effectiveness of a campaign by indicating how many mobile communication devices received ads, which ads each mobile communication device received, and the percentage of drivers visiting establishment location associated with the ad after being presented the ad. Analytics on the marketplace performance can influence valuation of road segments and time periods in the road model.

History. Location-based advertising has been around for a long time. Billboards along the side of highways have evolved along with the automobile. There were approximately 450,000 billboards on United States highways as of 1991. Sometimes a billboard campaign is first seen hundreds of miles from an establishment. Finally, the curious folks who are lured to stop may return to their car to find it plastered with a bumper sticker to further propagate advertising along their own journey. On a more local level, location-based advertising can take other forms. States routinely post signs with the generic description of amenities to be found at upcoming exits. A condo developer posts signs along the nearest major artery. Restaurants and furniture stores hire sign spinners to perform at nearby intersections. On weekends realtors put out signs alerting motorists of a nearby open house. What each of these has in common is that they compete for the attention of passing motorists in an effort to turn them into customers. Driven by this goal a business may deploy advertising resources where and when they will have the most impact.

Implementations of the present technology for mobile advertising can present ads at least in part based on one or more of the following: geographic proximity between a mobile communication device and an advertising business; raw volume of traffic (raw number of potential customers); user demographics, e.g., likelihood that offer target will become a customer; convenience, e.g., willingness of certain demographics to divert from path of travel under certain circumstances; time of day, day of week, etc.; other competing signs and campaigns; and cost.

Components of the system. The system can include elements for creating a campaign, associating ads with specific geographies and aggregate user demographics, and presenting offers to users. The components of the system include: server-based data models, mobile communication devices, and campaign tools.

Server data models. There can be three connected data models on server resources that combine to form a basis for the system. These data models relate the geographic (map), potential customer volume (traffic), and the road segment demographics: map data model; traffic model; route context (part of road segment demographics).

Map data model. The map data model can be thought of as parallel to the physical streets and intersections. Each roadway can be represented in the model through its geographic coordinates and a set of attributes. The coordinates allow the roadway to be accurately drawn on a map, incorporated into a planned route, or uniquely associated with a vehicle's GPS system as it is driving down the road. The attributes of the roadway provide other information that we associate with a roadway including name, addressing, form of way, speed limit, etc. Similarly, intersections locations are known along with ingress and egress options. Beyond location and attribution, the map data model provides information about the relative topology of the street network. This topological information allows optimal (e.g. fastest, shortest, least traffic) routes to be computed. It also lends itself for analysis to determine locations within an x-minute drive time of a store location.

Block-level granularity. A single segment in the map data can represent a block of roadway. If you walked over to the next block (beyond an intersecting street) you are associated with another virtual street segment, and so on. The virtual model can sometimes be represented at a slightly finer granularity for topological reasons. This granularity represents the smallest unit to which an offer can be associated with and triggered from. Examples of segments include: the block you live on; the exit ramp from the freeway near your house; the southbound stretch of highway between exits 401 and 402; northbound Park Avenue between 49th and 50th Streets.

Targeting offers via the map data model. The map data model is analogous to the physical street networking that just as motorists can be targeted with physical signs along a busy arterial as they approach a restaurant, the system can deliver ads to a mobile communication device in a similar manner detected by GPS and the map data model.

Traffic Model. The traffic model can be spatially derived from the map data model and can have a one-to-one relationship to the map data. The traffic model can augment the map data model with bidirectional traffic volume.

Traffic flow. The traffic model can contain information about the volume and speed of traffic along each roadway. For example, while the map data model may suggest that a particular roadway is an arterial with a posted speed limit of 45 MPH, the traffic model monitors the actual traffic speeds and flow patterns.

Bi-directional. Most roads are bi-directional in that vehicles travel in both directions. Though some, of course, are not. The traffic model can represent roadways independently in each direction. In the system mobile communication devices are identified and targeted independently based on their direction of travel along a road segment.

Time-based metrics. In the traffic model speed and volume can be broken out by day of week and time of day. Time periods can be quantized into 15-minute intervals for a total of 672 time slots over the course of a week.

Route context (aggregated demographics). Another element that can be measured is the aggregate route context as drivers request routes using their geolocation-enabled mobile communication devices. For example, some percentage of motorists will be passing through to a location two hours away while others may be running errands or commuting home from the office. This information can suggests which types of offers can be most effective at a specific time and location. For example, a takeout dinner offer at 6 pm will be more successful at enticing motorists on a home commute compared to those whose destination far away. Conversely, a hotel offer delivered to a segment where drivers typically pass through towards a distant destination will be more effective than the same offer delivered to a motorist entering a suburb near their home.

Role of mobile communication devices. There can be multiple ads delivered to the mobile communication device as a result of segment and time slot triggering. The mobile platform can filter ads and present them via the mobile communication device as appropriate. The route context and proximity to familiar locations can be used (independently or together) to select which offers are likely to be most welcome to that mobile user. The mobile communication device can determine the most appropriate time to deliver each offer so as not to interfere with driving tasks.

Sorting offers. The mobile communication device can have information to determine which ads will be more welcomed than others. Consider a driver leaving Monterey, Calif. on US101. If the driver is enroute to San Diego then much can be assumed about desires and needs. If the route is projected to pass through Santa Barbara during the dinner hour then almost any segment along this route would be appropriate for triggering restaurant ads specific to Santa Barbara. Similar assertions might be made about needs for fuel and lodging. When no explicit route context is known then other assumptions might be applied. For example, whether the driver is far from home or if the path being taken is identical to one driven previously.

Filtering offers. As offers are filtered they can be to be presented at appropriate times. Appropriate presentation can take the following into consideration: allowing adequate time between offers; presenting before the location and with enough time and space to navigate to the ad location; not presenting ads when the driver is likely preparing for or executing an upcoming maneuver; utilizing longer quiet stretches of roadway away from interchanges and intersections to present offers; not presenting offers where traffic is likely to require more focused attention of the driver.

Designing a successful campaign. To be successful it is helpful that an ad campaign is easy to design, build and deploy. Campaign tools can allow advertisers to canvas the marketplace and assess offer potential. They also can allow advertisers to bid on and purchase the most {road segment, time slot, aggregate demographic}. Further, reports can provide feedback that can be used to evaluate and refine campaigns, along with adjust the model.

In some implementations of the technology, the campaign building process can leverage a variety of design patterns chosen to target various demographics and behavior. Moreover, if the patterns have a physical world analogy they should help advertisers relate to what otherwise would be an abstract concept.

Design patterns for marketplace campaigns. A design pattern is a formal way of documenting a solution to a design problem in a particular field and serves to bind complexity into an approach that is easy to implement and even automate.

Applying design patterns to location based advertising. The design patterns concept can be used in advertising campaigns and applied directly to the offer marketplace. Moreover, a tool can be built around a collection of patterns to facilitate constructing most of advertiser's campaign automatically. There are several well-known roadside advertising campaign patterns that could apply to the present technology. Examples of design patterns that can be used to build marketplace campaigns include: sign twirler; Burma-Shave; Wall Drug; windshield flyer; mascot.

Analytics for campaign feedback. Another useful process is to receive feedback and evaluate the effectiveness of a campaign after it has been deployed. After a campaign has been designed and deployed to the will be published to the communication network and presented via the mobile communication devices. The system can measure: how many mobile communication devices received a published ad; how many mobile communication devices presented the ad for viewing; where and when the ad was presented for viewing; whether an ad later resulted in a visit to the business.

Note that how many mobile communication devices received an ad is not the same as how many mobile communication devices presented the ad. Mobile communication devices can receive more ads than they can present. In addition, an ad may be inappropriate for a specific mobile communication device due to the specific route context of the mobile communication device. For example, an ad for a restaurant in Santa Barbara will not be presented at a mobile communication device with an explicit destination in Carmel over 4 hours to the north. Since only the mobile communication device knows the route context, the decision as to whether a published ad is presentable can be deferred to the mobile communication device.

Visitation. Similarly, if an ad is presented, only the mobile communication device is able to assess if the location (e.g. that restaurant in Santa Barbara) was actually visited. When an ad prompts a visit this is counted as a hit and the mobile communication device can report the visit. Knowing the exact ad, road segment, and time slot in conjunction with the visitation can be helpful in adjusting the campaign going forward.

Privacy management. Privacy is a topic that is becoming more and more important in location-based services. In advertising in particular there is a trade-off as advertisers want to know more and more about users while the users are becoming increasingly protective over privacy. In mobile advertising the dimension of real-time location has received considerable attention. Thus, one goal is to use as much location information as possible to provide the best ads while seeking to maintain the privacy and anonymity of users. Implementations of the present technology seek to maintain individual privacy through aggregation and anonymity.

Anonymous offer deliver. In some implementations elements of the system other than the user's own mobile communication device nor the advertiser can unilaterally determine presentation of a specific ad to a specific user. Further, as a mobile communication device receives additional published ads over time the elements of the system other then the user's own mobile communication device are not able to link those deliveries with previous ads.

Aggregated route context. One aspects of the technology is the use of aggregate route context for each transportation network segment and time slot. Aggregate route context serves to identify the intent of a class of transportation network users as they pass through a segment during a time slot. However, route context is maintained only in the aggregate and the technology (other than each mobile communication devices itself) does not unilaterally know the intent of specific mobile communication devices.

Route context retained in mobile. Since ad presentation is the responsibility of the mobile communication device, there is not a need to provide route context to the remainder of the system in real time—though route context can be provided either voluntarily, or after the fact, e.g., in order to accumulate aggregate route context for a given {segment, time slot}. Instead, the route context used for filtering and presenting ads is used (and retained) within the mobile communication device.

Anonymous presentation and visitation reporting. The mobile communication device also records which ads were presented and can record which ad-related locations were visited. This information is later anonymously sent back to the servers where it is aggregated. At no point does the technology unilaterally store, nor share with advertisers, presentation or visitation details from specific mobile communication devices.

The sign twirler pattern. Everybody has seen sign twirlers at busy intersections vying for the attention of motorists to advertise anything from restaurants and furniture sales to apartments and condos. The method goes by many names, including sign spinners, sign twirlers, sign guys, and human directionals. Their message usually is simple and to the point—to direct passing motorists to a nearby opportunity.

The sign twirler pattern is an effective campaign pattern for local businesses trying to drive immediate impulse business to their establishment. For example, the Sign Twirler pattern is suited for: lunch buffets; condominium sales; apartment rentals; furniture store sales; garage and estate sales, etc.

The Burma-Shave pattern. Burma-Shave was an American brand of brushless shaving cream and is famous for its advertising gimmick of posting humorous rhyming poems on small, sequential highway signs. Burma-Shave signs could be seen throughout most of the USA from 1925 until 1963. A sign campaign typically consisted of six signs spaced for sequential reading by motorists along otherwise boring stretches of highway. The last sign was almost always the Burma-Shave name. This approach was a successful advertising gimmick and drew the attention of motorists who were curious to discover the punch line. There were hundreds of Burma-Shave campaigns over the years, often having a highway safety theme.

The Burma-Shave pattern is a useful campaign approach for regional or national brands where specific location is not terribly important and the intent is to promote the brand. Examples where this pattern will be effective include: insurance companies; tire companies (e.g., promoting rain/snow tires seasonally or during a relevant weather event); drug companies (e.g., promoting antihistamines in the spring along road segments from urban to rural areas); florists; etc.

The Wall Drug pattern. Wall Drug is a tourist attraction located in the town of Wall, S. Dak. When it opened in 1931 it was an establishment in the middle of nowhere that found it difficult to attract customers from the highway. Business was slow until they came upon the idea of putting up billboards advertising free ice water to parched travelers heading to the newly opened Mount Rushmore monument 60 miles (97 km) to the west. This technique was successful and today billboards can be seen advertising Wall Drug hundreds of miles away throughout South Dakota and neighboring states. Wall Drug still offers free ice water, and in addition they now offer free bumper stickers to further propagate their campaign throughout the USA. It's estimated that Wall Drug spends $400,000 on billboard signs every year!

The Wall Drug pattern is useful for advertising locations that have the potential to attract travelers from far away or divert travelers in the course of their journey to another primary destination. Uses for the Wall Drug campaign pattern include: amusement parks; tourist novelties (e.g., Winchester Mystery House); temporary shows (art exhibits, theatrical productions, music festivals); etc.

The windshield flyer pattern. Occasionally upon leaving a sporting event or a movie we return to our car to find a flyer tucked under the windshield wiper blade. Typically the advertising is for a nearby pub or an upcoming event. This pattern works a bit differently from the others described thus far. While an ad can be delivered to a mobile communication device triggered by a {segment, time slot} as described above, the ad will only be presented if the mobile communication device has been stopped at a location for some period of time. Thus, driving by a soccer stadium may deliver the ad to the mobile communication device, but the act of parking for the duration of a match prompts the mobile communication device to present the ad, e.g., upon the mobile communication device starting to move again.

Real windshield fliers are often met with annoyance and disgust. As a result, they're often associated with low-budget advertising campaigns. However, the windshield flyer pattern in the virtual world can successfully avoid this lowbrow stigma. First, there is no physical flyer to remove from the windshield and thus no trash to dispose of Secondly, delaying the ad presentation can remove connotations one might associate with the practice in general.

The windshield flyer pattern can be useful for advertisers wishing to target a more specific demographic. For example, consider vehicles stopped for more than an hour at a soccer complex on a weekend. A campaign targeting soccer moms could present a sale at a sports shop or present a coupon for a nearby Jamba Juice. Examples include: sporting goods stores targeting sports complexes and golf courses; the local community theater targeting professional theater parking; REI targeting hiking trail parking; pet stores targeting dog parks and beaches; SeaWorld targeting Disneyland parking; restaurants and clothing stores targeting their competitors' locations The mascot pattern. The mascot pattern is based on the practice of hiring people to dress up in costume to draw the attention of passersby. Usually, the costume directly references a product or service found inside. For example, a chicken restaurant might have a person dressed as a chicken out front. Unlike the sign twirlers, there are no directions or signs, just an attention getting gimmick that directly relates to a product offering. For example, a pint of Guinness mascot would be directly associated with the Irish pub at that same location.

The mascot pattern can be useful for advertisers who want to direct attention to the principal product or service they are offering. The pattern will often be associated with only a few road segments right at the establishment and the visuals of the offer are likely to convey a very specific service or product. Since there are no directionals associated with the pattern, the ad can be presented via the mobile communication device exactly at the associated segment, e.g. in front of the establishment.

In order to facilitate an understanding of environments in which example implementations described herein can operate, reference is made to FIG. 1, which shows, in block diagram form, a communication system 100 in which implementations of the technology can be applied. The communication system 100 may comprise a number of mobile communication devices 103 that may be connected to the remainder of system 100 in any of several different ways. Accordingly, several instances of mobile communication devices 103 are depicted in FIG. 1 employing different example ways of connecting to system 100.

These figures are exemplary only, and those persons skilled in the art will appreciate that additional elements and modifications may be necessary to make the communication device, e.g., 103 operable in particular network environments. While in the illustrated implementations, the communication devices, e.g., 103 may comprise smart phones, in other implementations, the communication devices may comprise personal digital assistants (PDA), tablet computers, laptop computers, desktop computers, servers, or other communication devices capable of sending and receiving electronic messages.

Mobile communication devices 103 are connected to a wireless network 101 that may comprise one or more of a Wireless Wide Area Network (WWAN) 102 and a Wireless Local Area Network (WLAN) 104 or other suitable network arrangements. In some implementations, the mobile communication devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communication devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), Ev-DO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet) and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that might connect to the wireless connector system 120.

The wireless connector system 120 allows the mobile communication devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communication devices 103, and intranet file services.

The wireless connector system 120 typically provides a secure exchange of data (e.g., email messages, personal information manager (PIM) data, and IM data) with the mobile communication devices 103. In some implementations, communications between the wireless connector system 120 and the mobile communication devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

Figure 3:
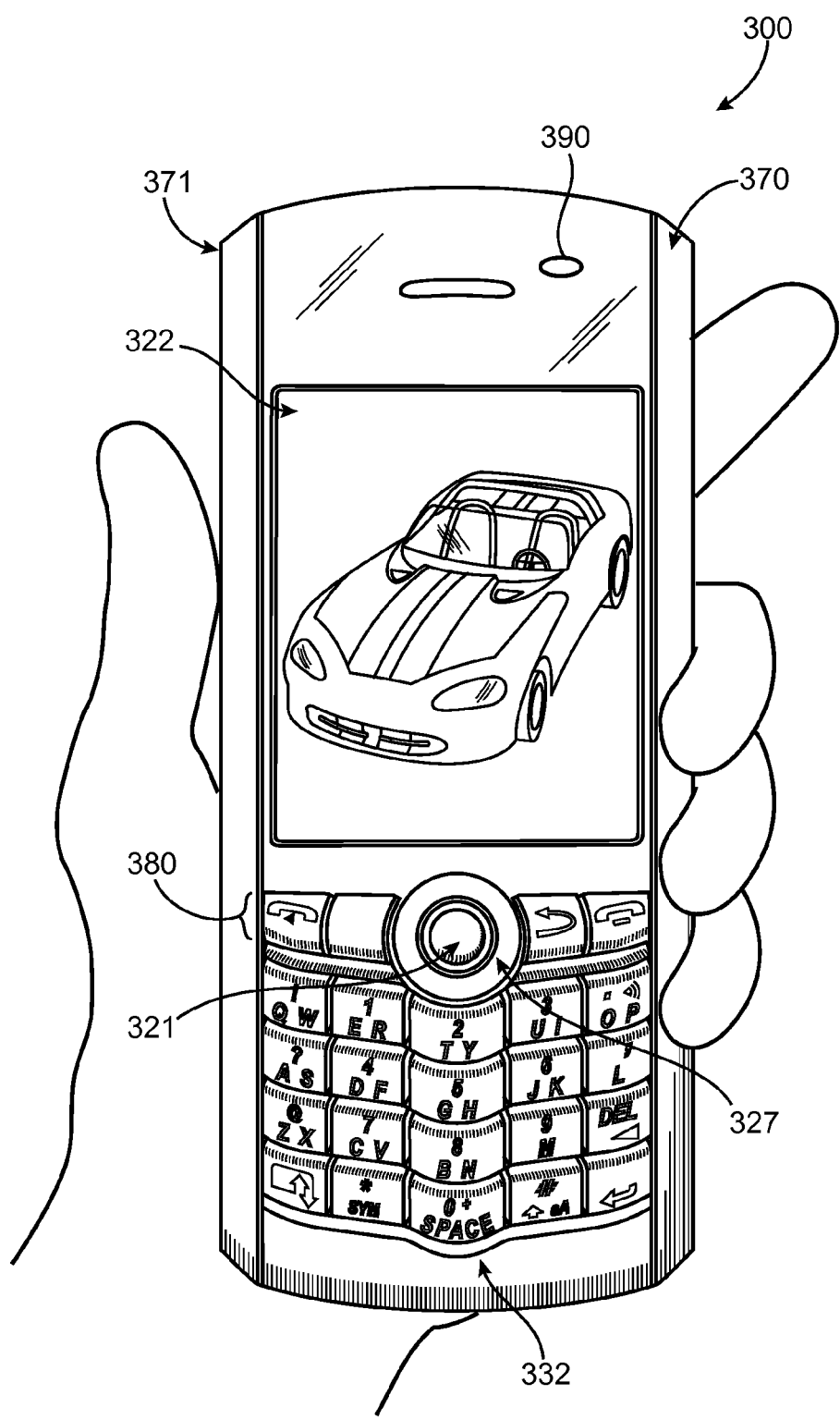
FIG. 3 illustrates an exemplary mobile communication device.

As will be appreciated from FIG. 3, an exemplary mobile communication device 300 (as an example of 103) comprises a display 322 located above a keyboard 332 constituting a user input means that is suitable for accommodating textual input to the device 300. In some implementations, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. The front face location of a cursor navigation tool 327 allows the tool to be thumb-actuable, e.g., like the keys of the keyboard 332. Some implementations of the technology provide the navigation tool 327 in the form of a trackball 321 that may be utilized to instruct two-dimensional screen cursor movement in substantially any direction, as well as act as an actuator when the trackball 321 is depressed like a button. Other implementations can provide the navigation tool in the form of a track pad, a touchpad, a pointing stick, joystick, graphics tablet, or combinations thereof. The placement of the navigation tool 327 can be above the keyboard 332 and below the display screen 322; here, it may avoid interference during keyboarding and does not block the operator's view of the display screen 322 during use.

The device 300 may be configured to send and receive messages. The device 300 includes a body 371 that can, in some implementations, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 4:
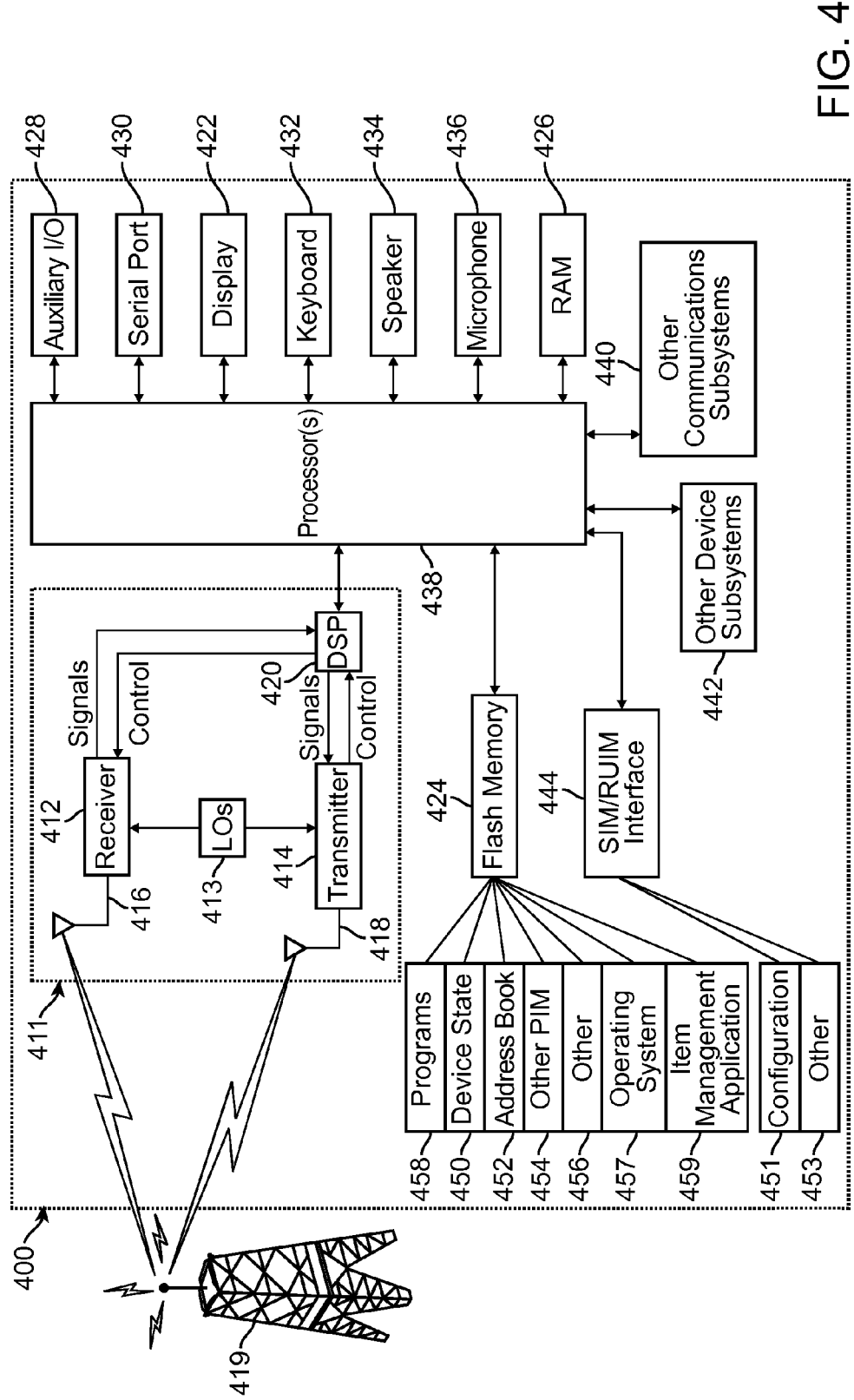
FIG. 4 illustrates a block diagram of a communication device.

Referring to FIG. 4, a block diagram of a communication device, such as 300 and 103, in accordance with an exemplary implementation is illustrated. As shown, the device 400 includes a microprocessor 438 that controls the operation of the communication device 400. A communication subsystem 411 performs communication transmission and reception with the wireless network 419. The microprocessor 438 further can be communicatively coupled with an auxiliary input/output (I/O) subsystem 428 that can be communicatively coupled to the communication device 400. In at least one implementation, the microprocessor 438 can be communicatively coupled to a serial port (for example, a Universal Serial Bus port) 430 that can allow for communication with other devices or systems via the serial port 430. A display 422 (e.g., 322) can be communicatively coupled to microprocessor 438 to allow for display of information to an operator of the communication device 400. When the communication device 400 is equipped with a keyboard 432 (e.g., 332), the keyboard can also be communicatively coupled with the microprocessor 438. The communication device 400 can include a speaker 434, a microphone 436, random access memory (RAM) 426, and flash memory 424, all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some implementations not all of the above components are included in the communication device 400. For example, in at least one implementation, the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321, as illustrated in the exemplary implementation shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or they can be of a software nature, typically constituted by representations of physical keys on a display 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display 422, which in one implementation is enabled by touching the display 422, for example, with a stylus, finger, finger tip, finger nail, or other pointer, to generate the character or activate the indicated command or function. Some examples of displays 422 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communication device 400 is shown on the display 422 in the same configuration as the physical keys. Using this configuration, the operator can select the appropriate physical key corresponding to what is shown on the display 422. Thus, the desired character, command or function is obtained by depressing the physical key corresponding to the character, command or function displayed at a corresponding position on the display 422, rather than touching the display 422.

Furthermore, the communication device 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display 422. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458, or parts thereof, may be loaded in RAM 426 or other volatile memory.

In some implementations, the flash memory 424 may contain programs 458 for execution on the device 400, including—but not limited to—an address book 452, a personal information manager (PIM) 454, and a device state 450. Furthermore, programs 458, such as social software, and other information 456 including data can be segregated upon storage in the flash memory 424 of the device 400.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 can be configured to operate some features without a SIM/RUIM card, but it will not necessarily be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary implementation are combined into a single antenna (not shown). As one skilled in the art would appreciate, the antenna or antennae (416, 418) in another implementation can be externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice or data, or both voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 103, 300, 400, for use in the technology can be characterized by an identification number assigned to the device. Such identification numbers cannot be changed and are locked to each device.

Implementations of the technology can be realized as programming across the architectural elements identified in FIG. 1, FIG. 3, and FIG. 4. In some implementations, the programming is entirely on the mobile communications device 103. In some implementations, programming for the technology is on the mobile communications device 103, while data used by the mobile communications device 103 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (ASIC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Figure 5:
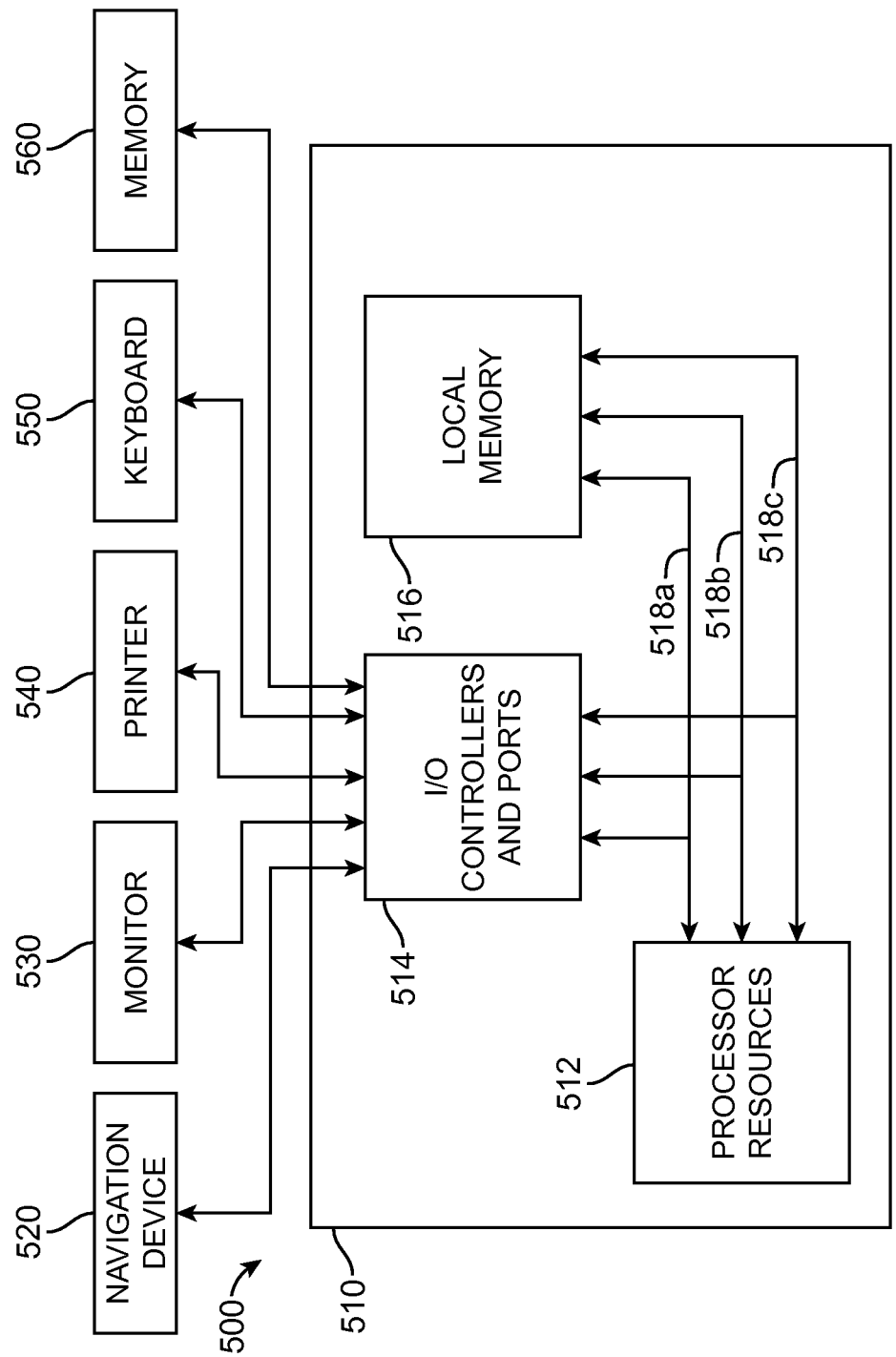
FIG. 5 illustrates a data processing architecture suitable for storing a computer program product of the present technology and for executing the program code of the computer program product.

Referring to FIG. 5, a data processing system (e.g., 500) suitable for storing a computer program product of the present technology and for executing the program code of the computer program product can include at least one processor (e.g., processor resources 512) coupled directly or indirectly to memory elements through a system bus (e.g., 518 comprising data bus 518a, address bus 518b, and control bus 518c). The memory elements can include local memory (e.g., 516) employed during actual execution of the program code, bulk storage (e.g., 560), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 550, displays 530, pointing devices 520, etc.) can be coupled to the system either directly or through intervening I/O controllers (e.g., 514). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A computer-implemented method for presenting information via a mobile communication device in a road network, the road network modeled by road segment and time slot, with the time slot being a time period, the method comprising:
   receiving information tagged by modeled road segment, modeled time slot, and aggregate route context of road network users in the road segment and time slot, wherein the aggregate route context includes the following: origin, destination, via points, routes, layovers, or other elements of an itinerary past, present, and planned;
   publishing received information, including received tagged information, to a communication network of the mobile communication device;
   filtering published information for published information tagged with aggregate route context corresponding to route context of the mobile communication device; and
   presenting the filtered information via the mobile communication device with the presented information comprising at least one advertisement.

2. The method of claim 1 wherein:
   filtering is performed at the mobile communication device.

3. The method of claim 1 further comprising:
   monitoring actions, related to presented information, of the mobile communications device; and
   reporting monitored actions to the source of the received information.

4. The method of claim 3 wherein:
   the reported action is not directly attributed to the mobile communication device.

5. The method of claim 1 further comprising:
monitoring actions, related to presented information, of the mobile communications device; and
reporting monitored actions to the source of the received information.

6. The method of claim 5 wherein:
monitored actions comprise at least one of arrival at a location, and purchasing using the mobile communication device.

7. The method of claim 1 further comprising:
monitoring actions, related to presented information, of the mobile communications device; and
modifying the aggregate route context as a function of the monitored actions.

8. A computer program product for presenting information via a mobile communication device in a road network, the road network modeled by road segment and time slot, with the time slot being a time period, the computer program product comprising:
a non-transitory computer-readable medium, encoded with instructions that when executed by a processor:
receive information tagged by modeled road segment, modeled time slot, and aggregate route context of road network users in the road segment and time slot, wherein the aggregate route context includes the following: origin, destination, via points, routes, layovers, or other elements of an itinerary past, present, and planned;
publish received information, including received tagged information, to a communication network of the mobile communication device;
filter published information for published information tagged with aggregate route context corresponding to route context of the mobile communication device; and
present the filtered information via the mobile communication device with the presented information comprising at least one advertisement.

9. The computer program product of claim 8 wherein:
filtering is performed at the mobile communication device.

10. The computer program product of claim 8 wherein the instructions, when executed by a processor further:
monitor actions, related to presented information, of the mobile communications device; and
report monitored actions to the source of the received information.

11. The computer program product of claim 10 wherein:
the reported action is not directly attributed to the mobile communication device.

12. The computer program product of claim 8 wherein the instructions, when executed by a processor further:
monitor actions, related to presented information, of the mobile communications device; and
report monitored actions to the source of the received information.

13. The computer program product of claim 12 wherein:
monitored actions comprise at least one of arrival at a location, and purchasing using the mobile communication device.

14. The computer program product of claim 8 wherein the instructions, when executed by a processor further:
monitor actions, related to presented information, of the mobile communications device; and
modify the aggregate route context as a function of the monitored actions.

15. A system for presenting information via a mobile communication device in a road network, the road network modeled by road segment and time slot, with the time slot being a time period, the system comprising:
processor resources;
a non-transitory computer-readable medium:
in communication with processor resources, and
encoded with instructions that when executed by a processor:
receive information tagged by modeled road segment, modeled time slot, and aggregate-route context of road network users being in a target audience in the road segment and time slot, wherein the aggregate route context includes the following: origin, destination, via points, routes, layovers, or other elements of an itinerary past, present, and planned;
publish received information, including received tagged information, to a communication network of the mobile communication device;
filter published information for published information tagged with aggregate route context corresponding to route context of the mobile communication device; and
present the filtered information via the mobile communication device with the presented information comprising at least one advertisement.

16. The system of claim 15 wherein:
filtering is performed at the mobile communication device.

17. The system of claim 15 wherein the instructions, when executed by a processor further:
monitor actions, related to presented information, of the mobile communications device; and
report monitored actions to the source of the received information.

18. The system of claim 15 wherein:
the reported action is not directly attributed to the mobile communication device.

19. The system of claim 15 wherein the instructions, when executed by a processor further:
monitor actions, related to presented information, of the mobile communications device; and
report monitored actions to the source of the received information.

20. The system of claim 15 wherein:
monitored actions comprise at least one of arrival at a location, and purchasing using the mobile communication device.

21. The system of claim 15 wherein the instructions, when executed by a processor further:
monitor actions, related to presented information, of the mobile communications device; and
modify the aggregate route context as a function of the monitored actions.

* * * * *